United States Patent
Yeomans

(10) Patent No.: US 9,192,090 B2
(45) Date of Patent: Nov. 24, 2015

(54) SOIL WORKING, SOWING AND FERTILIZING IMPLEMENT

(71) Applicant: Allan J. Yeomans, Gold Coast (AU)

(72) Inventor: Allan J. Yeomans, Gold Coast (AU)

( * ) Notice: Subject to any disclaimer, the term of this patent is extended or adjusted under 35 U.S.C. 154(b) by 240 days.

(21) Appl. No.: 13/905,330

(22) Filed: May 30, 2013

(65) Prior Publication Data

US 2013/0319306 A1 Dec. 5, 2013

(30) Foreign Application Priority Data

May 31, 2012 (AU) ............................... 2012902267

(51) Int. Cl.
| | |
|---|---|
| *A01C 23/00* | (2006.01) |
| *A01C 5/06* | (2006.01) |
| *A01B 15/02* | (2006.01) |
| *A01C 23/02* | (2006.01) |

(52) U.S. Cl.
CPC .............. *A01C 5/062* (2013.01); *A01B 15/025* (2013.01); *A01C 23/025* (2013.01)

(58) Field of Classification Search
USPC ........... 111/73, 120, 123–125, 147, 152, 153, 111/156, 170, 174, 175; 172/194, 722
See application file for complete search history.

(56) References Cited

U.S. PATENT DOCUMENTS

| | | | |
|---|---|---|---|
| 2,690,113 A * | 9/1954 | Altgelt et al. ................. | 172/720 |
| 4,585,074 A * | 4/1986 | Fleischer et al. .............. | 172/194 |
| 4,683,826 A * | 8/1987 | Solie et al. .................... | 111/124 |
| 4,770,112 A | 9/1988 | Neumeyer | |
| 4,773,340 A | 9/1988 | Williams et al. | |
| 5,537,942 A | 7/1996 | Wickstrom | |
| 6,986,314 B2 | 1/2006 | Linnebur et al. | |

FOREIGN PATENT DOCUMENTS

| | | |
|---|---|---|
| AU | 199453086 | 1/1994 |
| AU | 2003100796 A4 | 9/2003 |

* cited by examiner

*Primary Examiner* — Alicia Torres
(74) *Attorney, Agent, or Firm* — Wood, Phillips, Katz, Clark & Mortimer

(57) ABSTRACT

An implement for working of the ground or soil and applying seed, fertilizer or other materials into the ground which comprises a blade assembly mountable to an upright tool shank such as to allow at least limited pivotal movement of the blade assembly about a generally vertical axis, the blade assembly comprising blades which extend transversely relative to the shank and which are preferably in a V-shaped configuration, and one or more feed tubes which extend longitudinally of the blade or blades on the rear side thereof for supplying seed, fertilizer or other materials into the ground during the ground or soil working process.

16 Claims, 4 Drawing Sheets

SOIL WORKING, SOWING AND FERTILIZING IMPLEMENT

TECHNICAL FIELD

This invention relates to a soil working and sowing and/or fertilizing implement and in particular to an implement which is suitable for working the soil and sowing seeds and/or fertilizing concurrently with the soil working. The implement of the present invention is particularly but not exclusively suited to use in areas of land which are normally not cultivated due to their unworkable nature.

BACKGROUND OF THE INVENTION

A number of different implements are known which incorporate weeding or cutting knives, sometimes known as sweeps or sweep blades, which in use operate below the surface of soil and which are designed to sever the roots or stems of plants such as weeds or trees as they travel through the soil. In one form the implements are dedicated tools and comprise a rigid cutting blade. Alternatively weeding implements can be in the form of a rod which may be supported from a toolbar trailed from a prime mover such as a tractor so as to extend transversely relative to the direction of travel and which can be driven to rotate about its longitudinal axis. Implements of the above described type are required to be strongly constructed in a heavy gauge such as to carry out their required function. Consequently, these implements tend to disturb the soil more than is necessary or wanted.

Other forms of cutting knives for weeding are either in, or arranged in, a generally V-shaped configuration and secured rigidly to a tool shank normally to the trailing edge thereof. A disadvantage of this form of implement is that when the cutting knives engage roots or stems, the load applied to the knives is transferred as a twisting or torsional load to the tool shank. If the load is too high for example if a large stem or root or other obstruction is encountered by one of the knives, the twisting load transferred to the shank may be sufficient to damage the shank for example break off portion of the shank.

Sowing of seeds is also achieved in many different ways often in combined equipment for example in equipment which uses a plurality of transversely spaced apart furrow forming tynes for penetrating the ground and air seeding apparatus which feeds seeds to respective seed boots which are mounted to the rear of each tyne for supplying seeds into the furrows formed by the tynes. In addition to the supplying of seed, the seed boots may also be used to place fertilizer or other granular/liquid materials into the soil. The above type of equipment requires a plurality of tynes and a similar number of seed boots to feed the seeds/fertilizer into the ground. After a period of time, the mounting of the seed boots to the tynes tends to become worn resulting in significant movement of the seed boots relative to the tynes. This can result in seeds or fertilizer being placed in incorrect positions in the ground particularly when the implement is being used at high speeds.

It would be desirable if an implement was available which addressed one or more of the above disadvantages or which at least provided an effective alternative to the presently known implements. In particular it would be desirable if an implement was available which enabled both working of the soil as well as the application of seeds, fertilizer or other material or liquid into the ground or soil particularly but not exclusively in regions which are not normally capable of being easily cultivated.

BRIEF SUMMARY OF INVENTION

The present invention provides in a preferred aspect, an implement for working of the ground or soil and applying seed, fertilizer or other materials into the ground, said implement comprising a blade assembly, means for mounting said blade assembly to an upright tool shank such as to allow at least limited pivotal movement of said blade assembly about a generally vertical axis, and means on the trailing side of said blade assembly for supplying seed, fertilizer or other materials into the ground. The reference to "seed, fertilizer or other materials" throughout the specification includes any granular material or liquid which is required to be deposited in or applied to the ground.

The blade assembly suitably comprises at least one blade which extends in use transversely relative to the tool shank and thus in use transversely relative to the normal direction of movement of the tool shank. Typically the blade assembly operates in a substantially horizontal plane. Preferably the at least one blade has in cross-section, a leading edge and diverges rearwardly from the edge so as to penetrate the ground in use and open a region of the earth or ground rearwardly of the blade to facilitate acceptance of the seed, fertilizer or other material. The leading edge suitably is sharpened for cutting weeds, stems or other sub-surface materials or the like as the blade assembly travels through the ground.

Preferably the at least one blade is supported on a holder. Means are suitably provided for mounting the holder to the tool shank or tyne for pivotal movement of the holder and at least one blade about a substantially vertical or upright axis.

The supplying means for the seed, fertilizer or other materials may comprise one or more feed tubes. The feed tube or tubes may be arranged to extend longitudinally of the blade or blades of the blade assembly.

Most preferably, the blade assembly comprises a pair of cutting blades which extend in use laterally to opposite sides of the tool shank. Preferably the blades are angled outwardly and rearwardly from the shank so as to be in a generally V-shaped configuration. Preferably the holder includes opposite side arms to which respective cutting blades of the blade assembly are mounted or held. Preferably the side arms of the holder are arranged in a V-shaped configuration which defines the V-shaped configuration of the cutting blades when mounted to the holder arms. Preferably the feed tube or tubes are supported on or to the blade assembly holder and most suitably extend along the respective side arms of the holder.

Preferably the blades are releasably held to the holder arms to facilitate removal of the blades for replacement or repair. Preferably means are provided for securing the corresponding inner ends of the blades to the holder. Preferably the blades include tabs or lugs at their inner ends which are secured such as by bolting or pinning to the holder. Preferably the holder includes opposite slots into which the tabs or lugs are inserted. Preferably the tabs or lugs are apertured to receive bolts or pins passed through the slots of the holder and tabs or lugs which secures the tabs or lugs in the slots.

The holder may also include means for supporting the blades suitably substantially continuously along at least a portion of the trailing side thereof. Preferably the holder side arms includes forwardly extending, channels on their forward or leading side suitably extending along their length and the blades include elongated lugs or flanges which extend in the direction of their length on the rear side thereof adapted to be received closely and firmly within the channels so as to be supported thereby. Preferably the blades are of a greater length than the arms so as to extend laterally outwardly of the arms.

Preferably the side arms of the holder also include rearwardly directed channels on their rear or trailing sides which extend longitudinally of the arms and the feed tube or tubes are suitably at least partially located within the rearwardly directed channels to extend therealong. Where a plurality of feed tubes is used, they may be of different diameters for feeding different materials or to facilitate their neat location within the channels.

Preferably the tube or tubes is/are open at their free ends and the free end or ends of the tube/s are located within the rearwardly directed channel. The open end or ends of the feed tube or tubes define or defines an outlet or outlets for seed, fertilizer or other materials. The outlet or outlets are directed rearwardly relative to the holder arms so that seed, fertilizer or other material can be directed into the region of the earth or ground rearwardly of the holder arms which has been opened by the blade or blades. Most preferably a plurality of feed tubes are provided which have outlets at different positions longitudinally of the holder arms and thus blade assembly to enable placement of the seed, fertilizer or other materials at different locations transversely relative to the tool shank. The outlet or outlets may be provided with outlet nozzles or the like. The tubes may be of any suitable cross-section and may be of any form of hollow member but most typically are of a circular cross-section.

Preferably the holder also includes a central arm and the side arms extend symmetrically and laterally outwardly on opposite sides of the central arm. The central arm is suitably integrally formed with the side arms. The central arm suitably includes on opposite sides, the slot or respective slots for receiving the tabs or lugs of the cutting blades. The leading end of the central arm may comprise mounting means for mounting of or connecting the blade assembly to a tool shank. The central arm may also include on its trailing end means for supporting, carrying or guiding a downwardly extending fertilizer tube or the like centrally between the opposite side arms of the holder.

The pivotal mounting of the blade assembly to the tool shank may be a loose pivotal mounting so that the blade assembly is free for limited rocking movement in the vertical direction and relative to the tool shank such that the blade assembly may maintain a substantially horizontal attitude for a range of positions of the tool shank.

The blade assembly suitably is adapted to be mounted via its mounting means to a mounting bracket or clamp adapted to be secured or clamped to the rear or trailing side of the tool shank. The mounting bracket or clamp may be mounted for adjustable movement along the tool shank to change the height of operation of the blade assembly. Preferably, the mounting means of the holder forms a pivot connection with the mounting bracket or clamp. The pivot connection may be defined by a pivot pin supported on the mounting bracket or clamp and adapted to pass through an aperture or pair of apertures of the mounting means of the holder. One or both of the aperture/s of the holder mounting means and/or bracket may be enlarged or elongated to define the loose pivotal mounting of the blade assembly to the tool shank. Means may be provided for selectively locking the implement against pivotal movement relative to the mounting bracket or clamp and thus tool shank. The holder central arm may also include stop means which can cooperate with the mounting bracket or clamp to limit pivotal movement of the blade assembly in opposite directions.

In another aspect, the present invention provides an implement for working of the ground or soil and applying seed, fertilizer or other materials into the ground, said implement comprising a blade assembly, and a blade holder for supporting said blade assembly, said blade holder including a central arm and a pair of side arms extending outwardly and rearwardly of said central arm whereby said side arms are arranged in a V-shaped configuration, each said side arm including forwardly extending channels on its forward or leading side and rearwardly extending channels on its rear or trailing side, said blade assembly including a pair of blades, each said blade including elongated lugs or flanges which extend in the direction of their length on the rear side thereof and which are adapted to be received closely and firmly within the channels so as to be supported thereby and one or more feed tubes for supplying seed, fertilizer or other materials into the ground, said one or more feed tubes being located at least partially in said channels on the rear or trailing side of the holder side arms, and means for mounting said blade assembly to an upright tool shank such as to allow at least limited pivotal movement of said blade assembly about a generally vertical axis.

The implement described above by incorporating an earth working tool and seed/fertilizer tubes allows tilling or earth-working of the soil and simultaneous seeding and/or fertilizing in a single pass in areas or regions which are not normally cultivated as well in other normally cultivated areas or regions.

BRIEF DESCRIPTION OF THE DRAWINGS

Reference will now be made to the accompanying drawings which illustrate a preferred embodiment of the invention and wherein:—

DETAILED DESCRIPTION OF THE EMBODIMENT

Figure 1:
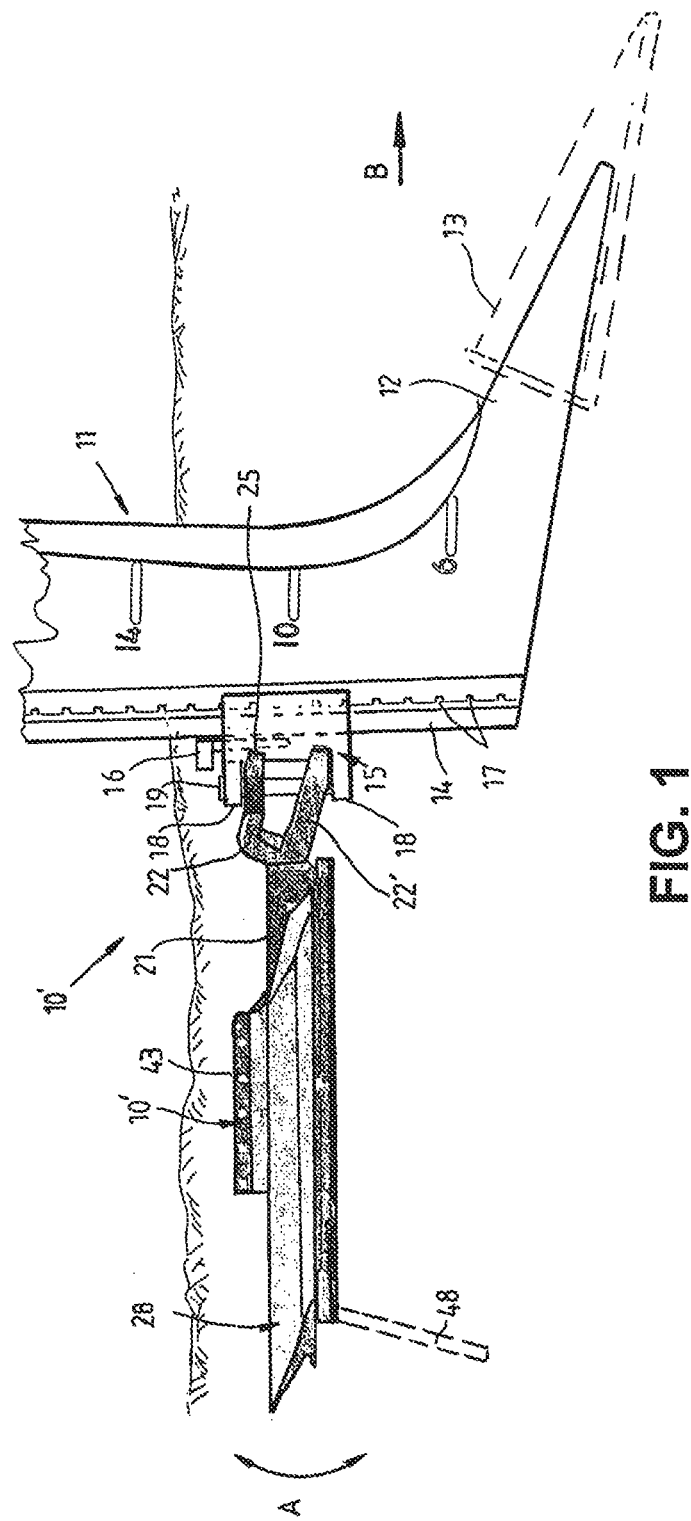
FIG. 1 is a side view of an implement according to an embodiment of the invention mounted to a tyne and located in an operational position in the ground.

Referring to the drawings and firstly to FIG. 1, there is illustrated a soil working and sowing and/or fertilizing implement 10 according to an embodiment of the invention mounted to the rear of a tool shank 11 which may have a leading foot 12 which supports in use an earth working point 13 (shown in dotted outline). The tool shank 11 is of known configuration and is provided with a guide track 14 along its rear edge with which a mounting bracket or clamp 15 for the implement 10 may be slidably engaged. The mounting bracket or clamp 15 may be secured in a desired position along the track 14 by means of a wedging member 16 which is inserted into bracket 15 between a wall of the bracket 15 and rear edge of the shank 11 to cause the mounting bracket 15 to be set in a position as determined by its engagement with locating lugs 17 on the shank 11. Such an arrangement is disclosed in my U.S. Pat. No. 4,976,566, the contents of which are incorporated by reference. The mounting bracket 15 in this case includes upper and lower apertured flanges 18 through which a pivot pin 19 may be inserted for connection of a trailing implement 10 as described further below.

Figure 2:
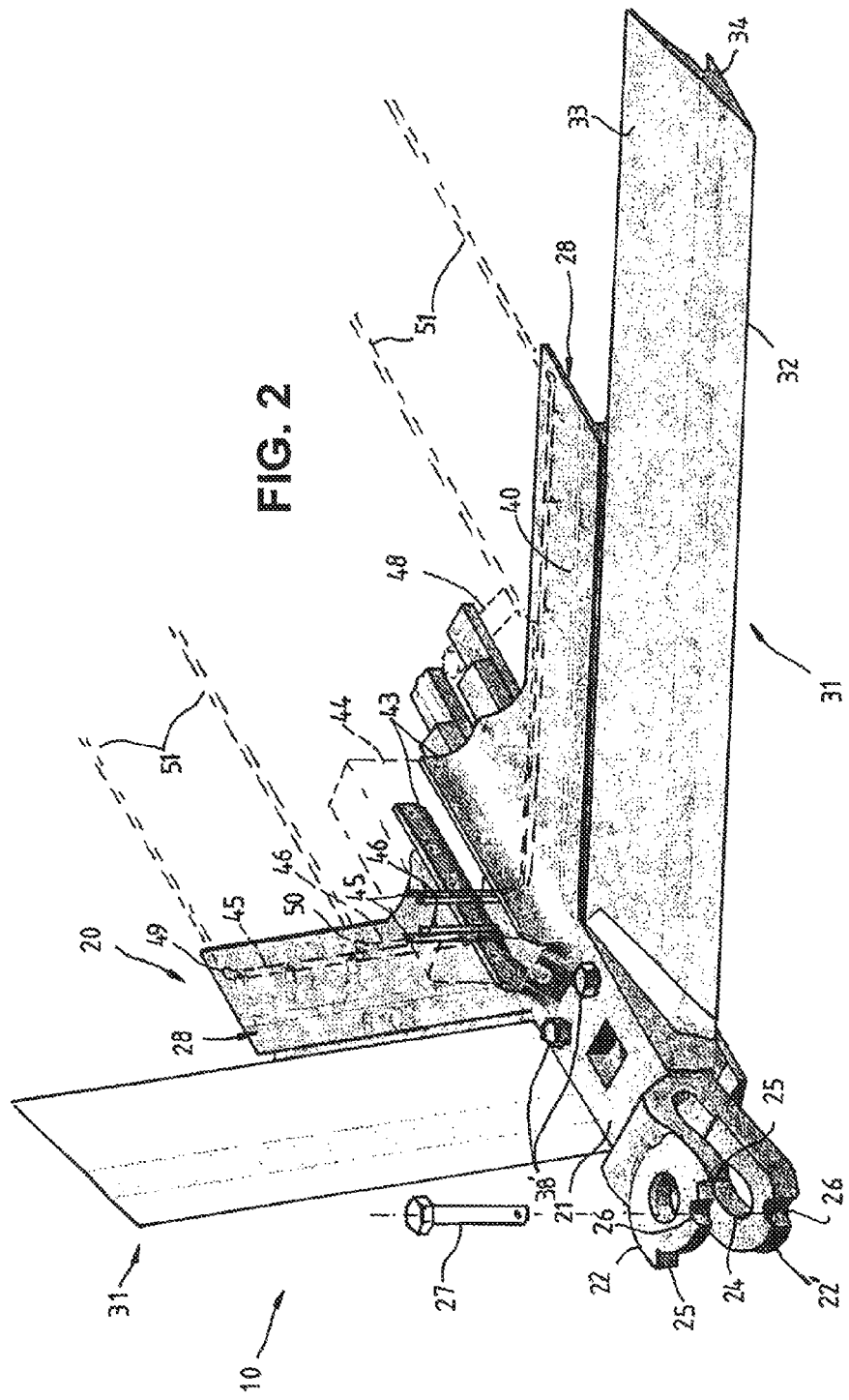
FIG. 2 is an isometric view from one side and the front of an implement according to the embodiment of FIG. 1.
Figure 3:
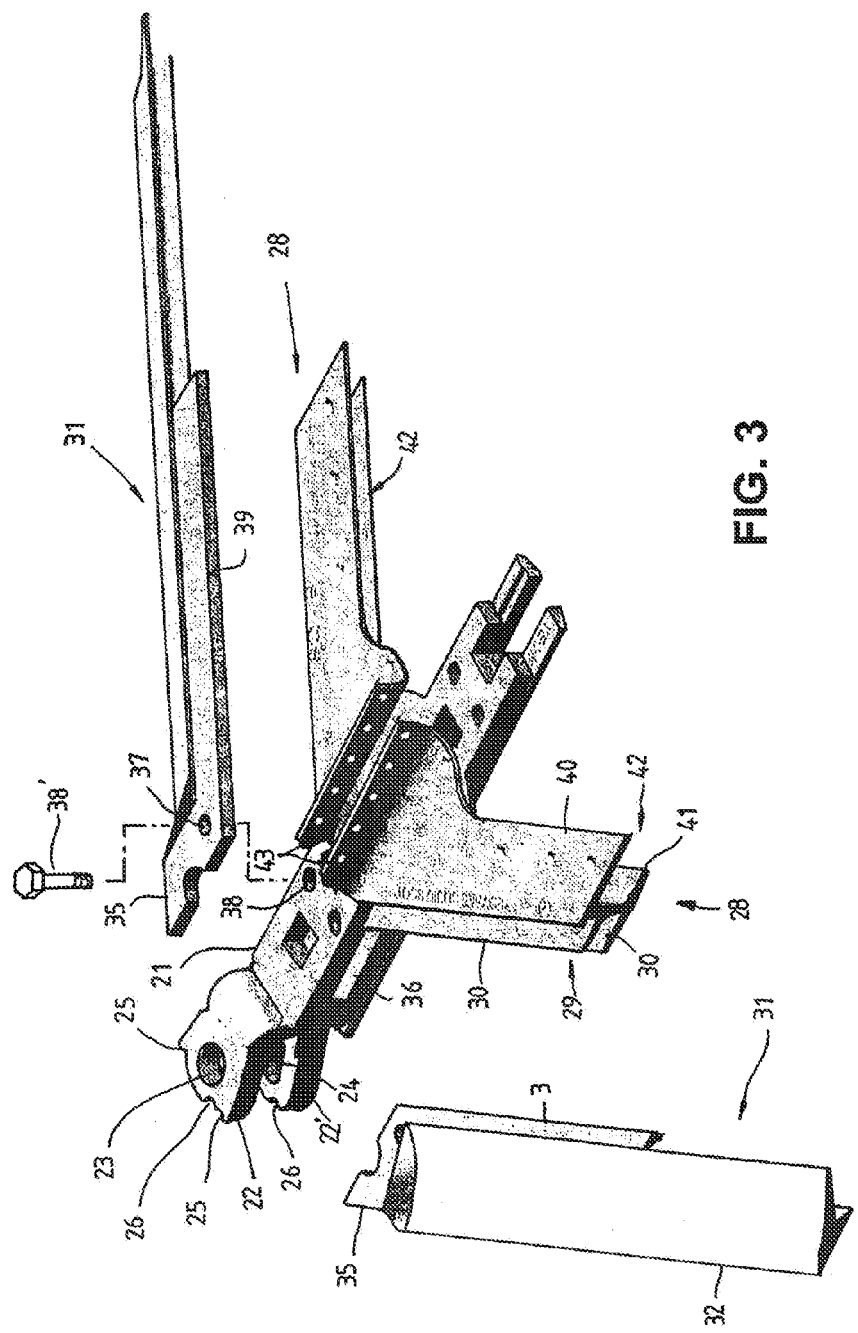
FIG. 3 is an exploded isometric view from the rear of the implement of FIG. 2.

The implement 10 as shown more clearly in FIGS. 2 and 3 comprises a blade assembly 10' which includes a blade holder 20 which comprises a central arm 21 which has spaced apart flanges or lugs 22 and 22' at its leading end, the flanges 22 and 22' having apertures 23 and 24 therein and being inserted in use between the mounting bracket lugs 18 such that the pivot pin 19 may be inserted through lugs 18 and through the aligned apertures 23 and 24 in the blade holder lugs 22 and 22° to secure the blade assembly 10' pivotally to the rear of the shank 11. At least the aperture 24 in the lower flange 22' of the holder 20 is of elongated or enlarged form as shown such that a loose pivotal connection is provided between the blade holder 20 and mounting bracket 15. This allows for limited rocking movement of the blade assembly 10' in the vertical direction as indicated by the arrows A in FIG. 1. This connection may also allow for limited rocking movement side-to-side.

The leading end of upper flange 22 of the central arm 21 also includes spaced apart stops 25 on opposite sides which when the holder 20 is pivoted can abut the bracket or clamp 15 to limiting pivoting movement of the blade assembly 10' about a vertical axis to prevent interference with or fouling of an adjacent implement or other tool. The upper and lower flanges 22 and 22' also include in their peripheries, vertically aligned part-circular recesses 26 through which a pin 27 may be inserted, the pin 27 also passing through aligned apertures in the lugs 18 of the mounting bracket 15. The pin 27 will thus serve as a lock pin to prevent, when inserted through the lugs 18 and flanges 22 and 22', pivotal movement of the blade assembly 10' about a vertical axis.

The holder 20 additionally includes a pair of side arms 28 integrally formed with the central arm 21. The side arms 28 extend to opposite sides of the central arm 21 and are angled rearwardly therefrom. The side arms 28 thus are in a V-shaped configuration in top view. The side arms 28 have on the leading side, forwardly extending channels 29 extending along their length and defined by upper and lower flanges 30 (see FIG. 3) which are disposed in a substantially horizontal plane.

The blade assembly 10' additionally includes a pair of blades 31, each of which has a leading edge 32 and upper and lower surfaces 33 and 34 (see FIG. 2) which diverge rearwardly from the leading edge 32. The blades 31 additionally include apertured tabs or lugs 35 at their inner ends which can locate in opposite slots 36 in the blade holder arm 21. The lugs or tabs 35 and holder arm 31 have apertures 37 and 38 respectively which are vertically aligned when the tabs or lugs 35 are received in the slots 36. Bolts 38' can be passed through the aligned apertures 37 and 38 in the arm 21 and lugs or tabs 35 and through the slots 36 to secure the inner ends of the blades 31 to the central arm 21 of the holder 20. The lugs or tabs 35 are also extended longitudinally along the rear of the blades 31 to form flanges 39 which are of a similar thickness to the width of the channels 29 between the flanges 30 such that the flanges 39 may be received neatly and firmly in the channels 29. The blades 31 thus are supported continuously on their rear side at least partially along their length. The blades 31 as illustrated particularly in FIG. 2 suitably have their leading edges 32 sharpened for efficient severing of weeds, roots or other materials in the ground.

The side arms 28 of the holder 20 also include on their trailing sides upper and lower flanges 40 and 41 which define channels 42 therebetween, the flanges 40 and 41 also usually being in a substantially horizontal plane. The flanges 40 at their inner ends increase in width and form upwardly directed mounting lugs 43 for mounting of a container, shroud or the like 44 (shown in dotted outline in FIG. 2), the purpose of which will become apparent below. The flanges 40 are also substantially coplanar with the upper surfaces 33 of the blades 31 at the rear edges thereof to form a relatively smooth transition between the blades 31 and flanges 40.

Figure 4:
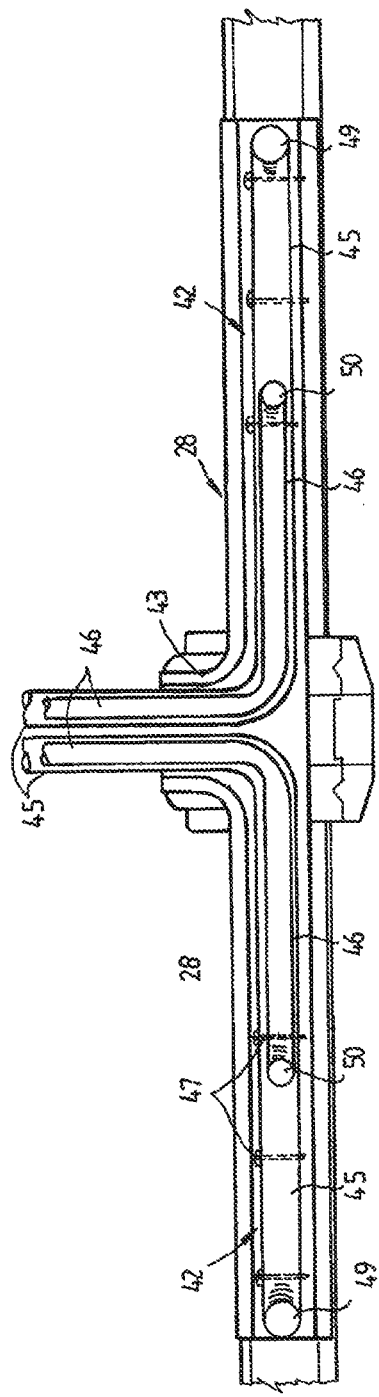
FIG. 4 is a partial rear view of the implement of FIG. 2 showing the seed/fertilizer tubes.

One or more feed tubes 45 and 46 may be located within the channels 42 to extend longitudinally thereof. The tubes 45 and 46 terminate at or adjacent the ends of the channels 42 or part-way along the channels 42 as shown in FIGS. 2 and 4.

The one or more feed tubes 45, 46 extend upwardly through the shroud or container 44 mounted on the lugs 43 and typically are connected to an air seeder. The shroud or container 44 protects the tubes 45,46 particularly when located below ground and also serves to guide all tubes 45,46 upwardly for connection to the air seeder. The air seeder may for example as is conventional have hoppers for seed and fertilizer which is distributed through an air stream to the respective tubes 45, 46. As referred to above, one or more feed tubes 45,46 may be provided along the opposite side arms 28 and different feed tubes may be of different diameters, for example 25 mm, 20 mm, 15 mm diameter to enable them to be located within the channels 42. All feed tubes may carry the same materials for example seed or fertilizer or different feed tubes may carry different materials for example seed in one tube and fertilizer in another tube. The tubes 45, 46 may also be held firmly within the channels 42 by means of ties 47 passed through apertures in the arms 28 (see FIG. 4).

The central arm 21 of the holder 20 may also carry at its rear end a downwardly extending further tube 48 (shown in dotted outline in FIG. 1) for feeding fertilizer or other materials into the soil at a position rearwardly of and in longitudinal alignment with the tool shank 11. Such an arrangement may be used where fertilizer is not supplied through the tubes 45,46 or for introducing different materials into the soil. The further tube 48 may be a rigid tube secured to the central arm or alternatively may be a flexible tube located within a shroud.

In use, the tool shank 11 is supported from a tool bar on an implement coupled to a prime mover and the tool point 13 on the foot 12 of the tool shank 11 arranged at the required cultivating or earth working depth. The height of the mounting bracket 15 along the tool shank 11 is adjusted to position the blade assembly 10' of the implement 10 beneath the surface of the ground typically a distance of 7.5 to 10 cm. As the tool shank 11 travels forwardly in the direction indicated by the arrow B in FIG. 1, the soil will be ploughed or cultivated. If any weeds, roots or plant stems are encountered in the path of travel of the blade assembly 10', they will be contacted by the sharpened leading ends 32 of the blades 31. Impact of the roots or stems on the leading ends 32 of the blades 31 will tend to cause pivoting movement of the blades 31 about the pivot axis defined by the pivot pin 19 but excessive pivoting movement will be resisted by the stops 25 abutting the bracket 15.

As the implement 10 is advanced, the diverging surfaces 33 and 34 of the blades 31 separates the soil to form an open region rearwardly of the blades 31 which can accept seed, fertilizer or other material supplied to the tubes 45,46 from an air seeder. In the arrangement illustrated in outline in FIG. 4 and FIG. 2, two pairs of tubes 45,46 are provided to run along opposite side arms 28 which terminate at open ends 49 and 50 respectively at the end of the holder arms 28 and intermediate the ends of the holder arms 28 respectively. The open ends 49 and 50 of the tubes 45 and 46 are directed rearwardly of the holder arms 28. Thus as the blade assembly 10' of the implement 10 is advanced through the soil, the seeds or fertilizer supplied to the tubes 45,46 will exit the open ends 49 and 50 in a rearward direction be deposited in the region of earth or soil which has been opened by the blades 31 in two lines 51 on either side of the implement 10 as shown in dotted outline in FIG. 2. Seeds or fertilizer will be thus placed at the most desired sub-soil location in the ground. If additional fertilizer is required or if fertilizer is not supplied through the tubes 45,46, it may be supplied into the ground through the supply tube 48 located at the rear of the central arm 21 of the implement 10 and as shown in dotted outline in FIG. 1.

The implement 10 may of course be in many different configurations. For example, the holder 20 may be formed integrally with the blades 31 although replaceable blades 31 are preferred. The implement 10 is also described and shown in use with a tool shank of a particular configuration. It will be appreciated however that the implement 10 may be mounted or connected to any other form of earth engaging or ground penetrating tool. The blades of the implement 10 may also be of configurations and cross sections other than that described. Further, means other than that described can be used for pivotally mounting the blade assembly 10' to the rear of a tyne or earth working tool.

Typically the seed and fertilizer supplied into the ground are granular materials however liquids may also be supplied to the ground by the blade assembly 10.

The reference to prior art herein including reference to prior patent applications is not to be taken as an admission that such prior art constitutes common general knowledge in the art.

The terms "comprising" or "comprises" as used throughout the specification are taken to specify the presence of the stated features, integers and components referred to but not preclude the presence or addition of one or more other feature's, integer's, component's or group thereof.

Whilst the above has been given by way of illustrative embodiment of the invention, all such variations and modifications thereto as would be apparent to persons skilled in the art are deemed to fall within the broad scope and ambit of the invention as defined in the appended claims.

The invention claimed is:

1. An implement for working of the ground or soil and applying seed, fertilizer or other materials into the ground, said implement comprising a blade assembly, said blade assembly being supported on a holder and means for mounting said holder to an upright tool shank such as to allow at least limited pivotal movement of said holder and said blade assembly about a substantially vertical or upright axis, said blade assembly comprising a pair of cutting blades which extend in use transversely of and laterally to opposite sides of the tool shank, said cutting blades being angled outwardly and rearwardly relative to said shank so as to be in a V-shaped configuration, each said blade having in cross-section, a leading edge and diverging rearwardly from the leading edge so as to penetrate the ground in use and open a region of the earth or ground rearwardly of the blade to facilitate acceptance of the seed, fertilizer or other materials, said holder including a central arm and opposite side arms to which respective cutting blades of the blade assembly are mounted or held, said side arms of the holder extending symmetrically and laterally outwardly on opposite sides of said central arm, said side arms being in a V-shaped configuration to define the V-shaped configuration of the cutting blades when mounted or held to the holder arms, said blades including tabs or lugs at their inner ends and wherein said central arm of said holder includes slots on opposite sides, respective said slots receiving a said blade tab or lug, said tabs or lugs being secured in the slots by bolting or pinning whereby said blades may be removed for replacement or repair, and one of more feed tubes on the trailing side of said blade assembly for supplying seed, fertilizer or other materials into the ground, said feed tube or tubes extending longitudinally of the blades of the blade assembly.

2. An implement as claimed in claim 1 wherein said feed tube or tubes are supported on or to the blade assembly holder and extend along the respective side arms of the holder.

3. An implement as claimed in claim 1 wherein said holder includes means for supporting the blades substantially continuously along at least a portion of the trailing sides thereof.

4. An implement as claimed in claim 3 wherein said holder side arms include forwardly directed channels on their forward or leading side and the blades include elongated flanges on the rear side thereof adapted to be received closely and firmly within the channels so that the blades are supported to the side arms of the holder.

5. An implement as claimed in claim 1 wherein the side arms of the holder include rearwardly directed channels on their rear or trailing sides which extend longitudinally of the arms and wherein the feed tube or tubes are at least partially located within the rearwardly directed channels to extend therealong.

6. An implement as claimed in claim 5 wherein said tube or tubes is/are open at their free ends, said free end or ends of the tube/s being located within the rearwardly directed channels of the holder side arms, said open end or ends of the feed tube or tubes defining an outlet or outlets for seed, fertilizer or other materials.

7. An implement as claimed in claim 6 wherein said outlet or outlets is/are directed rearwardly relative to the holder arms so that seed, fertilizer or other material can be directed into the region of the earth or ground rearwardly of the holder arms which has been opened in use by the blades.

8. An implement as claimed in claim 1 wherein said means for mounting the blade assembly holder to the tool shank comprises a mounting bracket or clamp adapted to be secured or clamped to the rear or trailing side of the tool shank, said central arm of the holder being pivotally connected to the bracket or clamp for said pivotal movement of the holder and blade assembly about a substantially vertical or upright axis.

9. An implement as claimed in claim 8 wherein said pivotal connection comprises a loose pivotal connection to allow for limited rocking movement of the holder and blade assembly relative to the tool shank such as to enable the blade assembly to maintain a substantially horizontal attitude for a range of positions of the tool shank.

10. An implement for working of the ground or soil and applying seed, fertilizer or other materials into the ground, said implement comprising a blade assembly, and a blade holder for supporting said blade assembly, said blade holder including a central arm and a pair of side arms extending symmetrically and laterally outwardly and rearwardly from opposite sides of said central arm whereby said side arms are arranged in a V-shaped configuration, each said side arm including a forwardly directed channel on its forward or leading side and a rearwardly directed channel on its rear or trailing side, said blade assembly including a pair of elongated blades, each said blade being provided on its rear side with an elongated flange which extends longitudinally of the blade and which is adapted to be received closely and firmly within the forwardly directed channel of a said side arm so as to support the blade to a holder side arm and one or more feed tubes for supplying seed, fertilizer or other materials into the ground, said one or more feed tubes being located at least partially in said rearwardly extending channels on the rear or trailing side of the holder side arms, and means for mounting said blade holder to an upright tool shank such as to allow at least limited pivotal movement of said blade holder and blade assembly about a substantially vertical or upright axis, said blades including tabs or lugs at their inner ends and wherein said central arm of the blade holder includes slots in opposite sides which receive the respective tabs or lugs of the blades, said tabs or lugs being secured in the slots by bolting or pinning.

11. An implement as claimed in claim 10 wherein each said blade has in cross-section, a leading edge and diverges rearwardly from the leading edge so as to penetrate the ground in use and open a region of the earth or ground rearwardly of the blade to facilitate acceptance of the seed, fertilizer or other material.

12. An implement as claimed in claim 10 wherein said feed tube or tubes is/are open at their free ends, said free end or ends of the tube/s being located within the channels on the rear or trailing sides of the holder side arms, said open end or ends of the feed tube or tubes defining an outlet or outlets for seed, fertilizer or other materials.

13. An implement as claimed in claim 12 wherein said outlet or outlets is/are directed rearwardly relative to the holder arms so that seed, fertilizer or other material can be directed into the region of the earth or ground rearwardly of the holder arms which has been opened in use by the blade of the blade assembly.

14. An implement as claimed in claim 10 wherein said means for mounting said blade holder comprises a mounting bracket or clamp adapted to be secured or clamped to the rear or trailing side of the tool shank, said central arm of the holder being pivotally connected to the bracket or clamp for pivotal movement about a substantially vertical or upright axis.

15. An implement as claimed in claim 14 wherein said pivot connection comprises a loose pivotal connection to allow for limited rocking movement of the blade holder and blade assembly relative to the tool shank such as to enable the blade assembly to maintain a substantially horizontal attitude for a range of positions of the tool shank.

16. An implement for working of the ground or soil and applying seed, fertilizer or other materials into the ground, said implement comprising a blade assembly, and a blade holder for supporting said blade assembly, said blade holder including a central arm and a pair of side arms extending symmetrically and laterally outwardly and rearwardly from opposite sides of said central arm whereby said side arms are arranged in a V-shaped configuration, said blade assembly including a pair of elongated blades, each said blade extending along and being supported to a respective side arm such that said blades are arranged in a V-shaped configuration, and one or more feed tubes for supplying seed, fertilizer or other materials into the ground, said one or more feed tubes being located at the rear or trailing side of the holder side arms, means for mounting said blade holder to an upright tool shank such as to allow at least limited pivotal movement of said blade holder and blade assembly about a substantially vertical or upright axis, said blades including tabs or lugs at their inner ends and wherein said central arm of the blade holder includes slots in opposite sides which receive the respective tabs or lugs of the blades, said tabs or lugs being secured in the slots by bolting or pinning whereby said blades may be removed for replacement or repair.

* * * * *